(12) United States Patent
Bessis et al.

(10) Patent No.: US 7,644,165 B2
(45) Date of Patent: Jan. 5, 2010

(54) METHOD AND APPARATUS FOR SIP MESSAGING

(75) Inventors: Thierry Bessis, Naperville, IL (US); Mauricio Cortes, Scotch Plaines, NJ (US); Jairo O. Esteban, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 803 days.

(21) Appl. No.: 11/141,546

(22) Filed: May 31, 2005

(65) Prior Publication Data

US 2006/0268857 A1 Nov. 30, 2006

(51) Int. Cl.
*G06F 15/16* (2006.01)
(52) U.S. Cl. .................. 709/228; 709/203; 709/227; 709/230
(58) Field of Classification Search ............ 709/203, 709/217–219, 227–232
See application file for complete search history.

(56) References Cited

U.S. PATENT DOCUMENTS

| | | | |
|---|---|---|---|
| 2004/0148395 A1* | 7/2004 | Schulzrinne | 709/227 |
| 2005/0175032 A1* | 8/2005 | Yeom | 370/466 |
| 2005/0188110 A1* | 8/2005 | Hollatz | 709/244 |
| 2005/0223104 A1* | 10/2005 | Pessi | 709/230 |
| 2006/0165060 A1* | 7/2006 | Dua | 370/352 |
| 2006/0176805 A1* | 8/2006 | Peters | 370/228 |
| 2007/0133440 A1* | 6/2007 | Bouat | 370/282 |
| 2007/0291734 A1* | 12/2007 | Bhatia et al. | 370/352 |

* cited by examiner

*Primary Examiner*—Phuoc Nguyen
(74) *Attorney, Agent, or Firm*—Fay Sharpe, LLP (57) ABSTRACT

A method and apparatus for encoding a SIP message into an internal binary format so that it can be treated much more efficiently by both the SIP stack layers and the application. Only one memory buffer is used to handle any sort of SIP message. For this reason, this new SIP message may be called a "mono-block" structure. It allows each SIP header's raw text from the original SIP message to be directly referred within the SIP mono-block with no additional copy. Only SIP headers that are "used" by the application, or by some SIP stack layer are parsed to form a "decoded" header object. The header parsing is made "on demand" at the moment header is accessed. Headers not used are not decoded and are left in text format with no additional processing needed.

16 Claims, 5 Drawing Sheets

METHOD AND APPARATUS FOR SIP MESSAGING

BACKGROUND OF THE INVENTION

This invention relates generally to communication systems. While the invention is particularly directed to the transmission of data in communication systems and will be thus described with specific reference thereto, it will be appreciated that the invention may have usefulness in other fields and applications.

By way of background, SIP (Session Initiation Protocol) is a standard designed by IETF (Internet Engineering Task Force) to provide advanced telephony services over the internet. SIP is used to establish, terminate and modify communications sessions in an IP (Internet Protocol) network, as set forth in the current standard, RFC 3261-SIP: Session Initiation Protocol, June 2002. (RFC 3261 specifies an Internet standards track protocol for the Internet community and requests discussions and suggestions for improvements.) SIP interoperates with existing protocols and swaps Meta data that enables session initialization.

As SIP only provides the method for dealing with sessions, it has to work alongside other protocols and standards, which provide the level of service required by real-time communication. To facilitate proper communication, SIP has to provide a range of features and functions to establish a session.

Once a party has been located, a session has to be established. Although SIP does not understand the session, it has to transmit the description of the session from the caller to the receiver. This usually results in negotiation between all of the parties involved in the call. It could be that a device does not support video, but only voice. SIP transfers this information using the multipurpose internet mail extensions (MIME). This is used in Web and e-mail services to describe content. This means there is always a wide-range of options available in negotiation. The most common form of session description used by SIP is the Session Description Protocol (SDP).

A call in progress can change features, such as a video stream being added to a voice conversation. New parties can also be added into a conversation, which requires additional negotiation of features. Call modification does not have to be as drastic as either of these measures. Common telephony functions, including muting and call holding, are also supported by SIP. The range of call features supported depends on the session description protocol in use. After all parties are finished with the session they hang-up. SIP has to deal with this call termination. It is also the job of a SIP device to register its current location with a UAS (user-agent server). This ensures that a party can be found even when mobile.

SIP has well-defined messages that are used for communication. A message can either be a request or a response message. In conventional SIP message architecture, both request and response SIP messages are built from the same three components: start lines, headers and the body.

The start line is the beginning of every SIP message. It is first used to identify the type of message and the protocol. Depending on the message type the start line is either a request-line for requests or a status-line for responses. A request-line includes a request URL, which is used to identify the requested party. This line can be rewritten by proxies, although the 'To' field later on cannot. A status-line holds the numeric status-code and the text version. SIP headers contain a list of fields that are used to identify message attributes. The body conveys the mechanics of a connection. It is common for the body to hold protocol information such as SDP, and only the receiving client can understand what the body means.

However, the "traditional" way to process a SIP message is highly inefficient, which makes a SIP-centric system, like the 3GPP IMS architecture, an implementation challenge. The IP Multimedia Subsystem (or IMS) is an IP multimedia and telephony core network that is defined by 3GPP and 3GPP2 standards and organizations based on IETF Internet protocols. IMS is access independent, as it supports IP-to-IP session over wireline IP, 802.11, 802.15, CDMA, packet data along with GSM/EDGE/UMTS and other packet data applications. IMS is a standardized reference architecture that consists of session control, connection control and an applications services framework along with subscriber and services data.

Generally, in systems such as the 3GPP IMS, an incoming SIP message is entirely parsed, and a multitude of internal objects are allocated from the memory by the SIP stack to represent the contained information in an internal format (i.e., "decoded" format). The initial SIP message buffer is, in general, lost, and it is very costly to copy or build a new SIP message from an old one, which are very desirable capabilities for SIP.

The present invention contemplates a new and improved method and apparatus that resolves the above-referenced difficulties and others.

SUMMARY OF THE INVENTION

The embodiments disclosed herein define a method and apparatus for encoding a SIP message into an internal binary format so that it can be treated much more efficiently by both the SIP stack layers and the application. The invention addresses various SIP processing performances issues such as: parsing of the whole SIP message, when only a few headers are actually useful to understand; multiple allocation/deallocation of memory blocks for a single SIP message; inefficient copying of SIP messages, very often used to reply, or proxy a SIP message; similar objects represented differently in the SIP stack and in the SIP application, or even inside the SIP stack itself, between its internal layers, making multiple copy and transcoding required; and a message format that does not allows it to be shared between boards with no pre-processing at each side.

The new SIPia message (where "ia" refers to Interface Application) is an accurate representation of an actual SIP message. Any element of information present in a conventional SIP message can be formatted in the improved SIPia message.

The embodiments disclosed herein typically use only one memory buffer to handle any sort of SIP message. For this reason, this SIPia message may be called a "mono-block" structure. It allows each SIP header's raw text from the original SIP message to be directly referred within the SIPia mono-block (in the table of content), with no additional copy. Only SIP headers that are "used" by the application, or by some SIP stack layer (using the API), are parsed to form a "decoded" header object. The header parsing is made "on demand" at the moment header is accessed. Headers not used are not decoded and are left in text format with no additional processing needed.

Original SIP raw text of unused and not modified headers can be directly used to generate an actual SIP message, i.e., the SIPia message knows when it can skip the "serialization" of a decoded header, and use directly the existing header text.

The creation, access, modification, and deletion of any information part of the SIPia message is only possible though an API, which allows the application and the SIP stack itself to be essentially unaware of the internal structure of the SIPia message.

SIPia messages use multiple pointers to store and retrieve the information that is in there. These pointers are all differential pointers, i.e., the content of a pointer gives the distance in bytes (signed offset) between its own location, and the object that it points to. This allows any SIPia message to be duplicated using a standard memory block copy instruction (like "malloc") and to be sent to a remote board with no further encoding. Normal pointers could not be understood by another CPU.

In one aspect of the invention there is provided a method of processing a SIP message in a communications network. The method comprises receiving a SIP message from the outside, wherein the SIP message includes a plurality of headers and text; allocating a new mono block structure, the structure including a plurality of zones; reading the SIP message; creating at least one header descriptor in a zone in the mono block structure; copying the SIP message to an initial SIP raw text zone in the mono block structure; and pre-parsing the initial SIP raw text zone.

In another aspect of the invention, pre-parsing the initial SIP raw text zone includes updating the corresponding header descriptor in the mono block structure for each header that is recognized; pointing a raw text pointer to the corresponding SIP text stored in the initial SIP raw text zone of the mono block structure; storing the actual length of the SIP text in the header descriptor; and leaving a pointer to the decoded portion of the text empty.

In yet another aspect of the invention, there is provided a method of creating a SIP message in a communications network. The method comprises allocating a mono block structure, the mono block structure including a management information memory zone, a table of content, an initial raw text zone, and a free zone; creating at least one header descriptor in the table of content; creating a string in the free zone that represents raw text for each header; binding the raw text to the corresponding header descriptor in the table of content; and marking each header to show that it has not been parsed.

In yet another aspect of the invention, there is provided an apparatus for processing a SIP message in a communications network. The apparatus includes a management information memory zone, a table of content, an initial SIP raw text message zone, a dynamic objects zone, a free zone, and a set of differential pointers.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, and steps of the method, whereby the objects contemplated are attained as hereinafter more fully set forth, specifically-pointed out in the claims, and illustrated in the accompanying drawings in which:

DETAILED DESCRIPTION OF THE PREFERRED EMBODIMENTS

Figure 1:
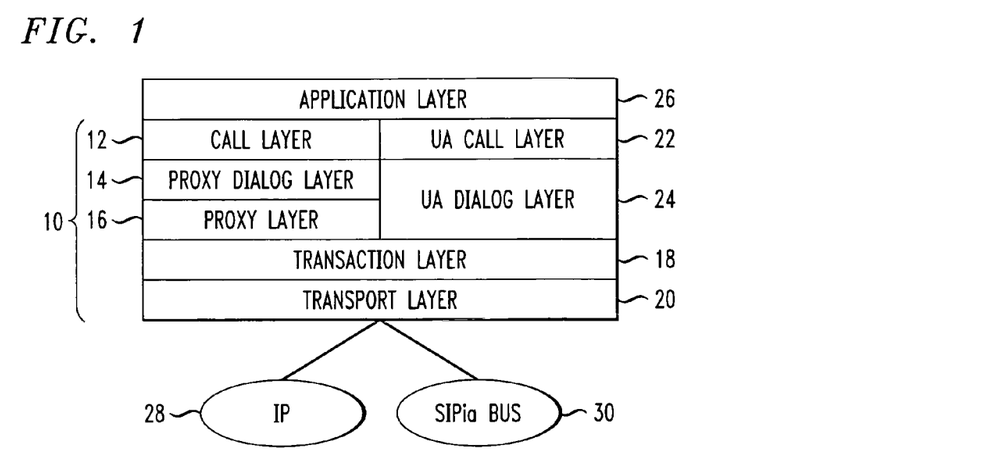
FIG. 1 is a block diagram of a SIP stack suitable for implementing aspects of the invention.

Referring now to the drawings wherein the showings are for purposes of illustrating the preferred embodiments of the invention only and not for purposes of limiting same, FIG. 1 provides a block diagram of a SIP stack 10 comprising five layers for proxy applications—a call layer 12, a proxy dialog layer 14, a proxy layer 16, a transaction layer 18, and a transport layer 20—and four layers for user agent (UA) applications—a UA call layer 22, a UA dialog layer 24, the transaction layer 18 and the transport layer 20. FIG. 1 shows the arrangement of these layers. The present invention focuses on the call and proxy dialog functionality. However, it is helpful to understand the commonality of the transport and transaction layers for both proxy and user agent applications, as well as the existence of the proxy layer 16—a middle layer that performs SIP routing decisions. The three bottom layers follow the descriptions found in RFC 3261.

The blocks on the left will be used by proxy applications, while the blocks on the right will be used by user agent applications. Applications that take both roles could make use of this stack instantiating both blocks. For example, a 3GPP S-CSCF behaves as a SIP proxy to establish and teardown calls and behaves as a user agent to notify a P-CSCF of network-centered events. Furthermore, the stack allows two or more 3GPP IMS control functions to coexist in the same application. The IMS control functions can share the transport and transaction layers 18, 20, and instantiate their own proxy, proxy dialog and call layers, such that each IMS control function can configure these layers to its needs.

Each layer has a manager and its corresponding abstraction. Each manager handles the allocation and deallocation of the abstraction, internally; the managers must keep track of all the instances that are currently allocated. In this way, managers can answer queries about these instances. For example, the transaction layer 18 typically includes a transaction manager (not shown) and a transaction abstraction (not shown). Applications or other stack layers can request the transaction manager to allocate a transaction. Further, they can query the transaction manager if a particular transaction exists.

The transport layer 20 deals with communication with other SIP entities. The transaction layer 18 is responsible for the exchange between two SIP elements of a request and its responses. The proxy layer 16 makes SIP routing decisions. The proxy dialog layer 14 stores information about an end-to-end connection, while the call layer 12 maintains information of all the connections involved in a session or call.

The transport layer 20 is responsible for sending and receiving SIP messages using standard (RFC 3261, chapter 18) and non-standard transport protocols. This layer hides the inherent complexity of exchanging messages with remote machines and local (same machine) processes. The transport layer supports UDP, TCP, and SCTP for IP accessible communications and the SIPia BUS protocol for local and remote communication. The transport layer 20 could be extended to support additional protocols as the SIP and telephony community see fit. The transport layer 20 must hide, without compromising performances, the complexity to read and write packets (UDP/SCTP), byte streams (TCP), to manage TCP connections and SCTP streams and associations, and to handle exceptions such as close connections, unable to deliver packet to remote user, etc. The transport layer 20 retrieves ICMP messages in order to gather information of these and other network exceptions.

The transaction layer 18 handles SIP messages and timers to support SIP transactions. A SIP transaction (RFC 3261, chapter 17) represents the message exchange between two adjacent SIP elements. A transaction is a container abstraction that collects the appropriate SIP messages. SIP transactions are intended to shield upper layers from the complexity of exchanging one request and one or more responses. Typically, proxies should create two transactions for each request message. Whenever a request arrives to a proxy, a server transaction must be created. This server transaction represents the exchange between the sender and the proxy. Whenever the request is forwarded to the next SIP hop, a second transaction must be created. This second transaction is called a client transaction. The client transaction represents the message exchange between the proxy and the SIP element. Although the client and server transactions are clearly related, they should not share any data structure since timers (e.g., retransmission) and messages (e.g., max-forwards headers) are actually different. Therefore, this layer is responsible for generating message retransmissions whenever a timer goes off and for reabsorbing retransmissions sent by either the previous or the next hop SIP elements. The former re-absorption will be done using information in the server transaction while the latter will be done using information stored in the client transaction. Further, this layer should support transaction timers that determine the transaction lifetime. Once these timers expire, the transaction layer will return all associated messages and informs its upper layer that the transaction has completed. Finally, the transaction layer 18 is responsible for handling low-level forking using information retrieved from DNS servers. This layer poses queries to DNS for NAPTR, SRV, and A records, in order to get the IP address of the next hop. If two or more addresses are returned, this layer should process them serially.

The proxy layer 16 should implement the standard behavior on how to route SIP messages (RFC 3261, chapter 16). This layer is responsible for routing related issues such as checking max-forwards, loop detection, spiraling, etc. Similar to the transaction layer 18, the proxy layer 16 must implement forking. Unlike DNS-based forking, a target set specified by an upper layer can fork a request to two or more destinations. The target set contains potential addresses. The application must specify how the target set must be processed—serial or parallel (RFC 3261, pages 43-44). In the event parallel forking has been specified, this layer should summarize all responses and forward a response message to the next layer. Each new incoming SIP request should create a request data structure. This data structure contains all the related transactions and a dynamic target set modified by redirection responses. Typically, there will be two transactions for every request, a server transaction and a client transaction. However, forking functionality forces us to support one or more client transactions. The proxy layer 16 disposes of the completed transactions. This layer will inform its upper layer that the request has ended when all its transactions have completed.

The proxy dialog layer 14 handles SIP dialogs for a dialog stateful proxy. RFC 3261 includes remarks for dialog creating and termination (see chapter 12). A SIP proxy dialog bundles one or more requests. That is, a proxy dialog is a container of SIP requests. A proxy dialog is created with the arrival of an INVITE or any dialog creation message. The proxy dialog state should include early dialog, calling, proceeding, and terminating. These values summarize the state of all the transactions involved in the proxy dialog layer 14. In addition, a dialog includes the list of route entries. The proxy dialog 14 will dispose of all the completed requests. It must inform the upper layer when all the requests have been completed.

The call layer 12 is responsible for managing information about calls, i.e., SIP sessions. A call is a collection of one or more dialogs. Since SIP sessions are multiparty, a call can have two or more dialogs. Typically, calls will have one dialog, but two or more legs should be supported. Like the proxy dialog abstraction, calls have a state that summarizes the states of all of its dialogs (RFC 3261, chapters 12 and 13).

FIG. 1 also shows an application layer 26. Applications must instantiate and configure all the needed layers. Each layer has a set of default parameter values that can be overridden by the application. For example, the application should be able to specify a set of ports to be opened by the transport protocol. Applications can override the set of timers used by the transaction layer. The proxy layer 16 can be configured to run the loop detection algorithm and the set of domain names.

Furthermore, the application 26 can specify the number of layers that will be needed. The stack allows applications to establish how many layers starting from the transport layer 20 are needed. This bottom-up approach enables applications to use only the functionality dictated by the problem domain. For instance, a stateless proxy could instantiate the transport layer 20 only, a transaction stateful proxy application will instantiate up to the proxy layer 16, while an S-CSCF is expected to instantiate the entire stack, including the call layer 22.

The application layer 26 must instantiate each layer from the transport layer 20 upwards. During this initial phase, the application 26 has the opportunity to configure each layer. For example, the application layer 26 can start the transaction layer 18, setting the forking policies that best suit the application and specifying the set of ports and protocols to the transport layer. However, applications should be able to change some parameters at runtime. For example, applications should be allowed to change the number of active threads executing on each particular layer. Therefore, OAMP functionality can modify these parameters to improve the application's performance.

If the application implements two or more IMS control functions, the transport layer 20 and the transaction layer 18 can be shared. However, the application should instantiate one or more of the upper layers for each IMS control function. For example, an application may need to implement an S-CSCF and an I-CSCF. The former is a call stateful proxy while the latter is a transaction stateful proxy. The former needs to instantiate all three upper layers: the proxy layer 16, the proxy dialog layer 14, and the call layer 22. In contrast, the latter control function requires the proxy layer 16 and possibly the proxy dialog layer 14.

Incoming SIP messages generally flow from the lower layers to the upper layers, while outgoing messages flow in the opposite direction. The transport layer gets the SIP message possibly from the wire, creating a SIPia message binary structure.

Each layer has two components, a manager and a domain abstraction. Each manager has an XXXPostMessage( ) function that receives a SIP message as one of its parameter. The manager will retrieve the appropriate abstraction for this message and post the message to the abstraction. This message flow is used for incoming messages when low-level abstractions have not yet been created. For example, a newly arrived BYE message has no corresponding transaction abstraction. The transport layer 20 will post the message to the transaction manager, and, in turn, it posts the message to the proxy manager since no transaction has been allocated. Since the new BYE message has no associated request, the proxy manager will post the message to the proxy dialog manager. This manager will find a matching dialog and post the message to this proxy dialog abstraction.

Each layer abstraction has two post functions that will be invoked depending on the direction for the message. YYYPostFromLo and YYYPostFromHi functions allow application and other layers to send messages directly to an YYY abstraction. Typically, a YYYPostFromLo function is invoked by the previous layer, while a YYYPostFromHi function is called by the next layer. Applications can modify this message flow such that the user-defined functions can examined each message as they are forwarded to the following layer. Any combination of these two message flows is also possible. Continuing with the BYE example in the previous paragraph, the proxy dialog manager will invoke the ProxyDialogPostFromLo with the newly arrived BYE message.

Upper layers like the application layer 26 can create a brand new SIP message, create a response from an incoming message, or create a message to be forwarded to the next SIP hop. These messages can be posted to any lower layer. Typically, the message will be posted to the next lower layer. However, applications should be able to post messages to any layer. In this way, applications can send messages to a particular transaction without going through any call, proxy dialog, or request abstractions. This flexibility allows applications to have a fine grain control over the entire stack.

Once a transaction, request, dialog, or call state changes, the corresponding layer must inform the next (upper) layer of the new state. Let's assume all the layers have been instantiated and a 200 OK (INVITE) message has arrived to the transport layer 20. The transaction abstraction will inform the corresponding request abstraction that the transaction has been completed. Likewise, the request will inform the corresponding proxy dialog abstraction that the request has been completed. In turn, the proxy dialog 14 will inform the appropriate call abstraction that the dialog has been established. Finally, the call abstraction will notify the application that the call has an established dialog.

Similarly, each abstraction will inform its parent abstraction that needs to be removed. For example, the transaction abstraction can indicate the next layer of the need of its removal either because of a transaction timeout or transaction completed. According to the standards, the latter should be issued only after the retransmission grace period.

SIPia-based applications can implement two or more functional sets. A number of applications need to play several roles simultaneously. For example, a 3GPP IMS S-CSCF is both a call stateful proxy and a notification server. Multi-functional applications need to instantiate one transport layer and one transaction layer. It is important to point out that a transport layer can support one or more ports and one or more transport protocols, in addition to these two layers, the application will need to instantiate one stack of upper layers for each functional set. For example, applications implementing an S-CSCF will instantiate the proxy layer 16, the proxy dialog layer 14, and the call layer 12 for the call stateful functionality and at least the user agent dialog layer 24 for the notification server functionality. If this application also needs to support BGCF functionality, it will need to at least instantiate a second proxy layer.

The application needs to register each functional set with the transaction layer 18, which acts as a demultiplexer, distributing the messages to the appropriate upper layer instance. In the previous example, there are two proxy layers and a user agent dialog layer 24 expecting messages from the transaction layer. Applications should register each functional set and their associated (protocol, port) list. In this way, external SIP-compliant applications can address a particular functional set by forwarding the SIP message to any one protocol and port pair in this list. DNS servers can be populated to store the triplets (protocol, IP address, and port) for every functional set. Standard-based SIP applications can retrieve this information from the DNS server.

FIG. 1 also includes IP 28 and an SIPia BUS 30. The SIPia BUS 30 is a software platform that utilizes SIP routing rules. The SIPia BUS 30 enables SIP servers (not shown) to communicate with each other in a highly efficient manner utilizing the SIPia BUS transport. The SIPia BUS 30 also communicates with a SIP port (not shown) for sending and receiving messages to other boards via the Internet.

The SIP stack 10 described above can be configured to run in active or passive mode. An active layer is defined as having one or more threads running exclusively for its abstractions, while a passive layer does not have a single thread assigned to it.

Applications can instruct the layer to run in either mode by setting on the layer manager the number of threads. Thus, applications have the flexibility to configure all, some, one, or none of the layers to be active. For those active layers, the application can specify the size of a queue as well. An active layer will place all messages arriving to the layer in the corresponding queue. If the message is posted from a higher or a lower layer, the message will be appended to the message queue. The queue elements retain the origin of the message, i.e., messages come from a higher or a lower layer. The active threads will be continuously retrieving messages from this queue, applying the corresponding SIP processing, and possibly invoking the XXXCallbackToYY (where XXX is an abstraction name, and YY=Hi or Lo) function.

Since passive layers do not have threads, the execution of their code will depend on application threads or some active layer. For example, this approach allows applications to define the transport layer as an active layer and leave all others as passive layers. With the appropriate callback configuration, the transport layer will be actively reading from the IP sockets and invoking a long chain of functions, such as SIPTransactionPostMessage, SIPProxyPostMessage, SIPProxyDialog PostMessage, SIPCallPostMessage, etc. This threading approach is used by SER, and, to a lesser extent, by Apache web servers. This approach has the advantage of reducing mutex contention and thread synchronization.

The application can configure all layers to be active. In this case, each layer has its own set of queues and set of threads. The messages are queued at each layer. With the advent of processor support for operating system threads (e.g., Intel's "hyperthreading" and Sun's "high throughput processors"), applications with a high thread count will benefit from this hardware.

Figure 2:
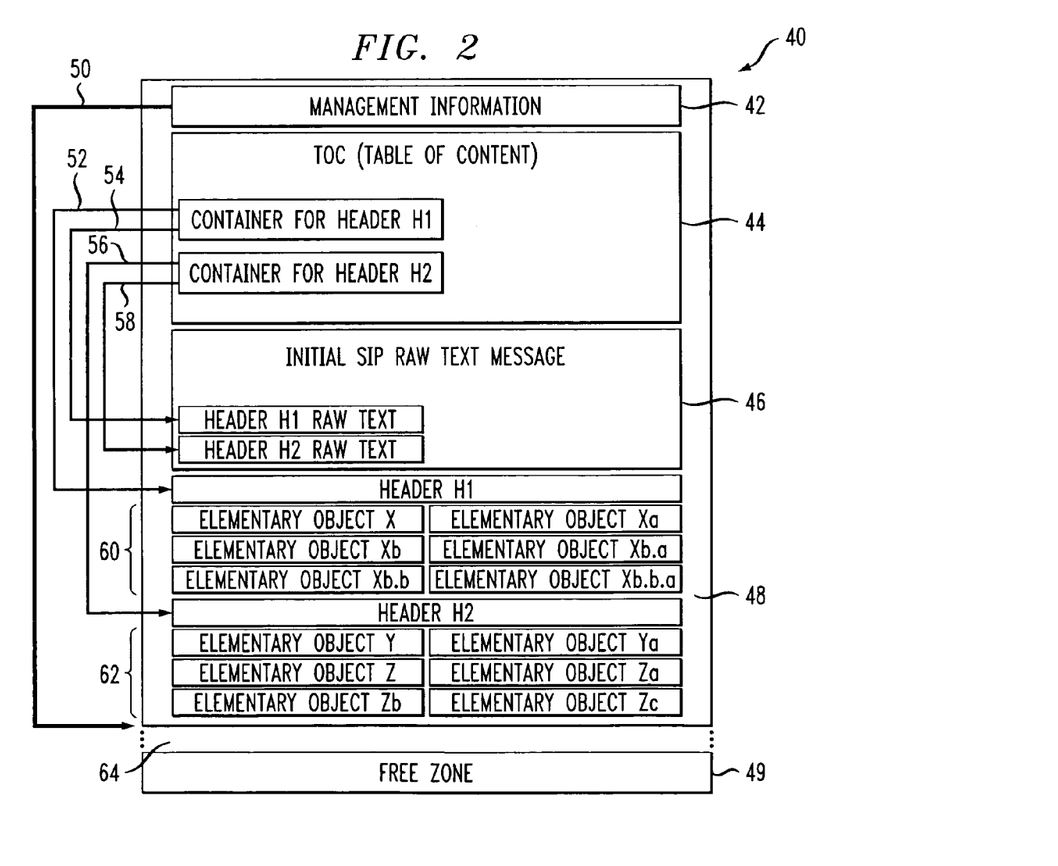
FIG. 2 shows a SIPia message according to aspects of the invention.

FIG. 2 shows a SIPia message (or mono-block structure) 40 including at least four sections (or zones), namely, a management information memory zone 42 (fixed length), a table of content (TOC) 44 (fixed length), an initial SIP raw text message zone 46 (variable length), a dynamic objects zone 48 (variable length), and a free area zone 49 (variable length).

The management information memory zone 42 handles some administrative information about the message dynamic structure. For example, this zone provides an offset pointer 50 to the free memory area 49 of the SIPia memory mono-block 40. That is, this is where new embedded decoded objects are created, soon to become part of the dynamic objects zone 48. It is not expected that memory is to be recovered and made available again when object are deleted within a SIPia message. Each time an object is created, the offset pointer 50 is incremented with respect to the length of the new object, so that this pointer always points to the free area 49.

The management information memory zone 42 also provides a via zone (not shown). This is a set of pointers or indexes to all the SIPia stack layers sessions that have been traversed so far, such as transaction index, proxy dialog index, call index, and user index. It allows any layers (in particular, the application) to be able to address all the involved sessions.

The management information memory zone 42 also provides other management information, as necessary. For example, it may provide the total length of the mono-block 40 (to know when no more dynamic objects can be created and/or the mono-block has to be extended), the compatibility version (in the event the SiPia message "evolves," to know whether it can be safely understood by the recipient or not), or a compression indicator (indicates whether the message should be compressed before to be sent or not).

The management information memory zone 42 has a fixed size and is allocated in any SIPia messages.

The TOC 44 is a static table that contains the header descriptors. Header descriptors are empty (filled with zeros) when the header is not present in the message. It may not be present because it was not found by the first pass parsing (for a SIP message received), or because it is not yet created by the application (for a SIP message created by the application). First pass parsing refers to the very first parsing made by the transport layer 20 for each received SIP message from outside, only to (a) identify which headers are there and where and (b) populate the TOC table 44 accordingly. The "decoded" headers are not built from this first pass parsing, except for some headers that the transport layer 20 would need to know about.

After a SIP message is received from the outside, each header descriptor in the TOC 44 contains information about headers that have been identified during the first pass parsing operation. When the parser recognizes a header, the corresponding header descriptor is updated: its status is set to "Not Parsed" and the pointer to the raw text part that describes this header is updated. Thus, FIG. 2 shows a first pointer 52 to the decoded header H1, a second pointer 54 to the raw text header H1, a third pointer 56 to the decoded header H2, and a fourth pointer 58 to the raw text header H2. If several headers of the same type are recognized, the container is actually a list object, which points to one header container for each of the recognized headers of the same type.

The TOC memory zone 44 has a fixed size and is allocated in all SIPia messages.

The initial SIP raw text zone 46 is a variable size memory zone. When a SIP message is received from outside, the text received is directly placed in the initial SIP raw text memory zone 46. The first pass parsing will recognize in it the different SIP headers and bind each relevant text portion to each SIP header in the TOC 44.

The dynamic object zone 48 is made up of two types of objects, namely, (a) groups of elementary decoded objects 60, 62 that represent decoded headers and (b) strings 64 that represent some SIP text (although there is no text shown in FIG. 2).

At the end of the allocated objects is the "free area" 49, where new objects can be allocated.

Figure 3:
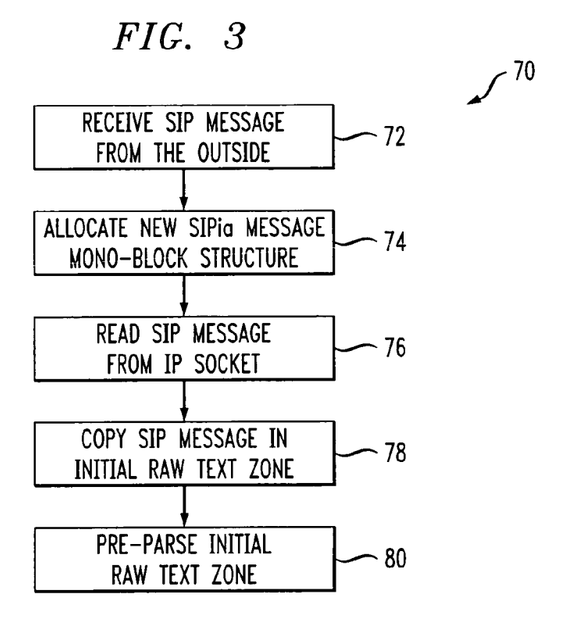
FIG. 3 is a flow chart showing a method of processing a SIP message according to the invention.

There are several processes associated with the SIPia message disclosed herein. With reference now to FIGS. 2 and 3, the first example involves the situation where a new SIP message is received from the outside. In this example, the SIP message contains only two headers. Of course, in practice, the SIP message will likely have more than two headers. As shown in FIG. 3, the following process (70) occurs.

Initially, a new SIP message is received from the outside (72). As a result, a SIPia message mono-block structure is allocated (i.e., some memory is claimed from the system) so that the incoming data can be stored in the initial raw text zone 46 (74).

Figure 4:
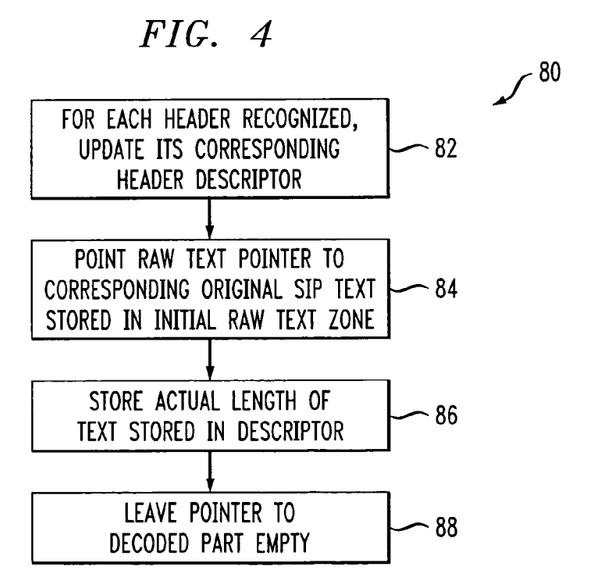
FIG. 4 is a flow chart showing a method of pre-parsing a SIP message.

Next, the SIP message is read from the IP socket 28 and at least one header descriptor is created in the TOC 44 (76). The raw text of each header is copied directly in the initial raw text zone 46 (78). First pass parsing is then invoked, i.e., the initial raw text zone 46 is pre-parsed (80). As shown in FIG. 4, the following sub-steps relate to the concept of "pre-parsing." For each header recognized, the corresponding header descriptor is updated (82). Its raw text pointer points to the corresponding original SIP text stored in the initial raw text zone 46 (84). The actual length of the text is also stored in the descriptor (86). The pointer to the decoded part is left empty (88), as the information inside the header is not parsed.

With TCP (a streaming protocol), it could happen that the frame received contains the current SIP message plus a part of the next SIP message. That fact can only be realized after the frame is pre-parsed. When that happens, the raw text corresponding the next SIP message is removed from the current SIPia mono-block message, while a new SIPia message is allocated to re-locate this raw text that were removed. The current SiPia message is forwarded to the transaction layer 18. If the next SIPia message is complete (i.e., has all the data), it is also forwarded to the transaction layer 18. Otherwise, it is put on hold, waiting for the next frame to get the remaining data.

Now, should the SIPia API (application program interface) be called upon to "read" a header field, this header would be decoded "on the fly." Each elementary object representing this header would be created (in the dynamic object zone 48) and linked together. The resulting decoded header would be now pointed to by the header descriptor. Any further call to the API to read this object would return the already decoded object, with no additional processing.

Until the header is modified (by the application or by any SIP stack layer), the raw text associated with a header descriptor still represents accurately the header. No header serialization (an operation that consists of generating the SIP raw text from a decoded object) would be necessary to generate the proper raw text to represent the header.

If the header was modified, then the header descriptor would "forget" the corresponding associated raw text. It would have to be regenerated to form a real SIP message.

Thus, the SIPia message structure minimizes optimally the number of operations required for parsing and serialization.

Figure 5:
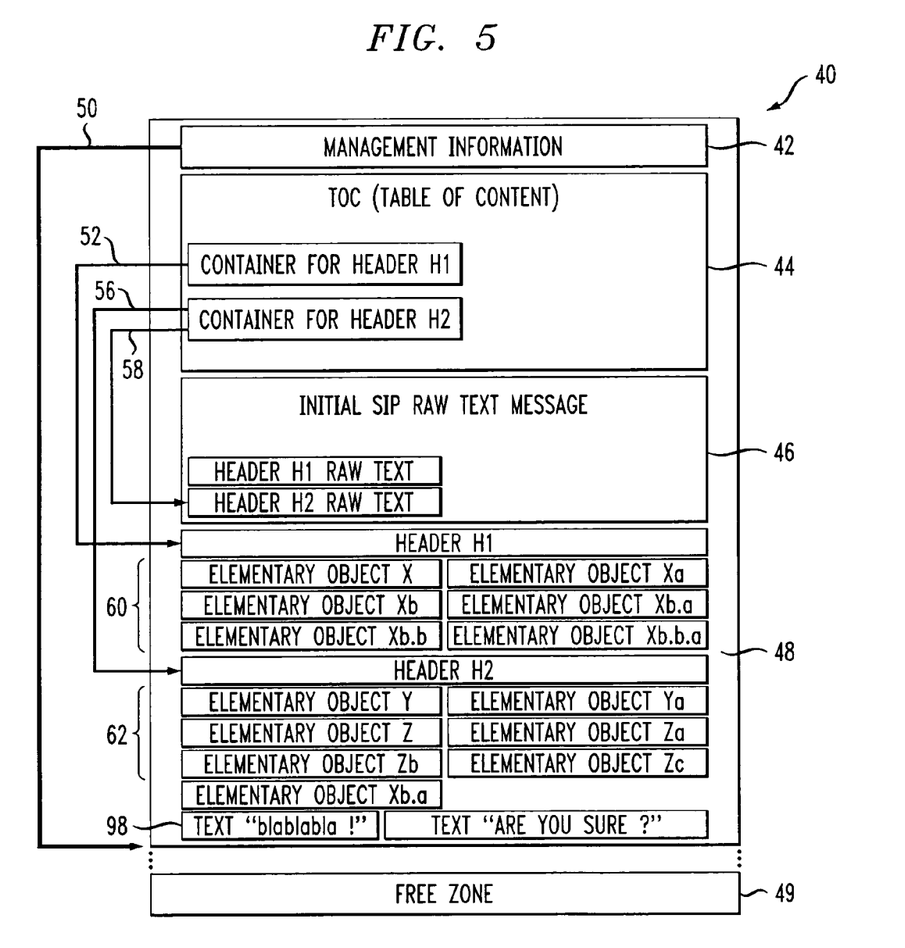
FIG. 5 shows an alternative embodiment of the SIPia message wherein an elementary object has been modified.

The second example involves the situation where a SIP message is received from the outside and is modified. Reference is now made to FIG. 5, which shows essentially the same SIPia message 40 as in FIG. 2, except for the fact that the user (i.e., an element that is "using" the SIPia message at that moment) has modified the elementary object Xb.a in the header H1. The new header Xb.a' is bigger, i.e., it will not fit back in its previous location. Also, the zone now includes text 98.

The header is an object, which is made up of several "child objects," and those "child-objects" can also be made of objects themselves. Headers are a hierarchy of objects, with a top down structure. Each "parent" object points (using a differential pointer) to its "child" objects. In the given example, FIG. 5, the header H1 has one child, object X, object X has two children, objects Xa and Xb, object Xb has two children, objects Xb.a and Xb.b, and finally object Xb.b has a unique child, object Xb.b.a.

In this example, the user wants to modify the object Xb.a, which is accessed though the SiPia message API, using the following "path" hierarchy: H1→X→Xb→Xb.a. In this example, it is assumed that the object Xb.a is to be replaced by a different object Xb.a', which is slightly bigger, and which contains itself two strings "blablabla" and "are you sure." To do that, the user replaces the object Xb.a by the object Xb.a' in the object X.b. In doing so, the object Xb.a' is created in the free area 49. Then the user creates the two text strings 98 (in the same free area 49), and inserts the two strings in the new object Xb.a'. Everything is done using the SIPia message API.

If the object Xb.a' was smaller or equal in size than the object Xb.a, then the object X.b.a' would have reused the space used by the object Xb.a. In this example, it is bigger, so it will not fit, and it is created in the free area 49. Again, this is invisible to the user and is managed by the SIPia message API.

Similarly, when a string is modified, the same principle applies. That is, if the new string is smaller or equal in size to the old one, it will re-use the same memory space in the SIPia message. Otherwise, a new space is used in the free area 66.

It should be noted that the link from the header container H1 to the header H1 raw text has been removed. This text zone does not accurately represent the new header H1 anymore.

Figure 6:
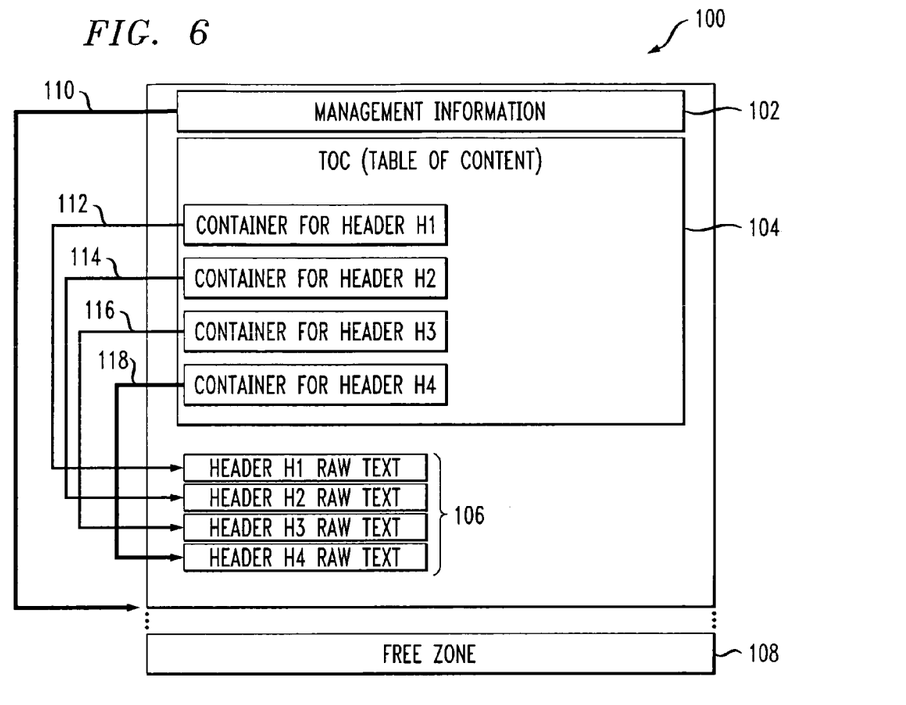
FIG. 6 shows yet another embodiment of the SIPia message.
Figure 7:
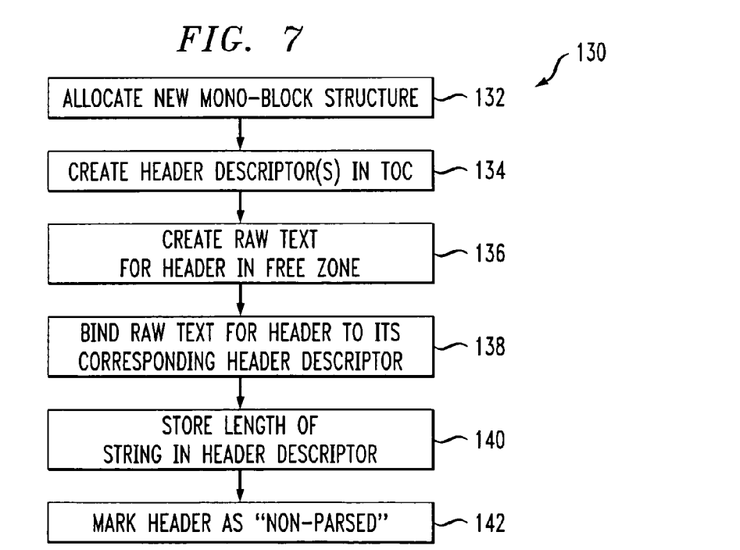
FIG. 7 is a flow chart showing a method of creating a SIPia message.

With reference now to FIGS. 6 and 7, yet another example is shown. In this example, a new mono block SIPia message 100 is generated "from scratch." This may happen, for example, when the SIP application initiates a new call. This may happen also when the call is originated by a non-SIP element (like an SS7-based entity) and must be converted to SIP. In this example, the user generates the serialized text for each header. Another possibility would have been to create the decoded objects instead and let the SIP stack serialize them when the SIP message needs to be sent outside. The SIPia message 100 includes a management information zone 102, a TOC zone 104, and a dynamic objects zone 106. The SIPia message 100 contains four headers, H1, H2, H3, and H4, in the TOC zone 104 at this point. Initially, the dynamic objects zone 106 would actually be empty, because the four headers H1, H2, H3, and H4 would have just been "declared" to the SIPia message 100. The SIPia message 100 also includes a free area zone 108.

Once the raw text for each header is created, a first pointer 110 points to "free area" in the free zone 108. In addition, a second pointer 112 points to the raw text for header H1, a third pointer 114 points to the raw text for header H2, a fourth pointer 116 points to the raw text for header H3, and a fifth pointer 118 points to the raw text for header H4.

As shown in FIG. 7, the following process 130 occurs. First, a new SiPia message mono-block structure is allocated (132), and at least one header descriptor is created in the TOC 104 (134). Next, the user creates the header H1 "raw text" in the free zone 108 of the mono block 100 (136) and binds it to its corresponding header descriptor in the TOC 104 (138). The length of this string is also updated in the header descriptor (140). In addition, because this raw text represents the header in text format, the header H1 is marked as "Not Parsed" (142). Steps 136, 138, 140 and 142 are repeated for each of the remaining headers—in this case, H2, H3 and H4.

Alternatively, the user could have created in the free zone 108 the decoded object H1, its elementary objects, and binds decoded object H1 to the corresponding header descriptor H1. The header descriptor would point to a decoded object, and not to a raw text object, as in the previous case, and the header would be marked as "Parsed."

Figure 8:
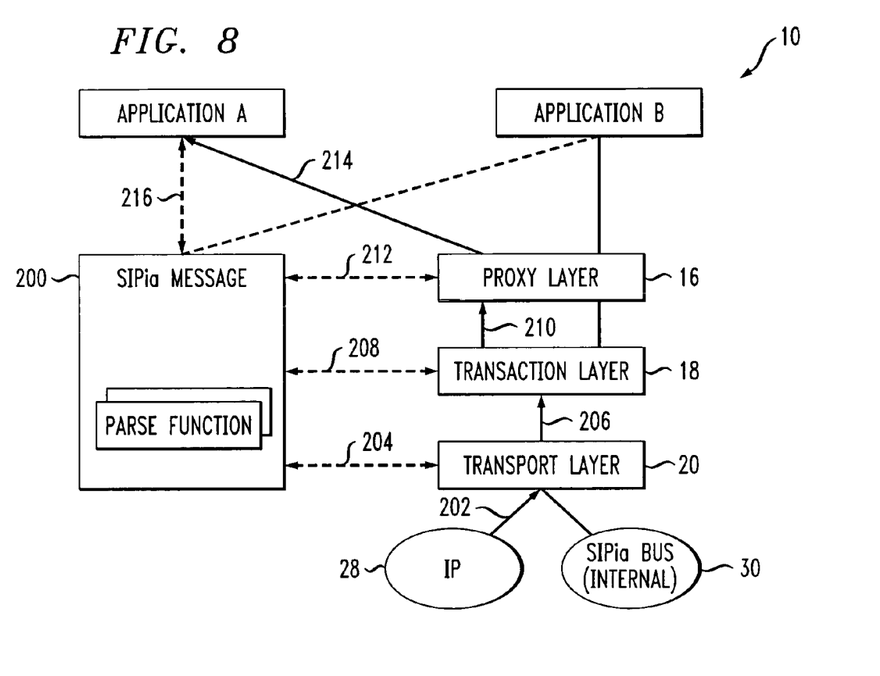
FIG. 8 shows the flow of a SIPia message across the layers of a SIP stack.

FIG. 8 shows the flow of a SIPia message 200 across the SIP stack 10 of FIG. 1. FIG. 8 also includes applications A and B.

Initially, a SIP text message is received by the transport layer 20 from the outside via IP 28 (202). The transport layer 20 allocates the SIPia message 200 (204). Then, the transport layer 20 stores the received SIP text message on the newly allocated SIPia message structure. The transport layer 20 pre-parses the SIP message, determining the SIP headers that are present in the message.

The transport layer 20 posts the message to the transaction layer 18 (206). The transaction layer parses some more fields that are necessary at this layer (208), such as the Request URL, "Via," "Route," "Cseq," Headers, etc. The SIPia message 200 is then received by the proxy layer (210). The proxy layer still needs to parse more fields (212), such as the "To" and "From" headers. The SIPia message is received by the application (214). The application will probably need more information and parse more fields (216), such as "Caller-ID." This depends on the role of the application and the type of application.

During the process across the layers, the SiPia message 200 is never reformatted or copied. The same SIPia API is used throughout the entire SIP server.

Figure 9:
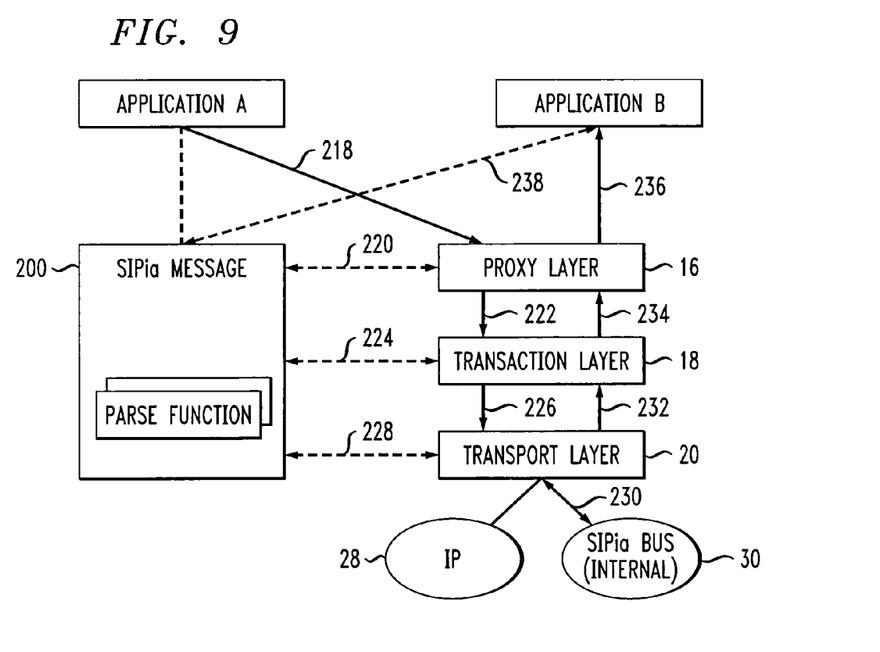
FIG. 9 shows the flow of a SIPia message between applications.

FIG. 9 is a block diagram showing the flow of the SIPia message 200 between applications A and B. Application A sends the SIPia message 200 to application B (218), where it first goes to the proxy layer 16. The proxy layer 16 analyzes a few fields of the SIPia message 200 (220), which has already been parsed, and then forwards it to the transaction layer 18 (222). The transaction layer 18 also analyzes a few fields (224), and then forwards it to the transport layer 20 (226). The transport layer 20 analyzes the destination and decides, in this case, that the next component is on the same host (228). The SIPia BUS 30 loops back the SIPia message 200 (230). The transport layer 20 forwards the message to the transaction layer 18 (232); the transaction layer 18 forwards it to the proxy layer 16 (234); and the proxy layer 16 forwards it to application B (236). Application B again needs to access the already parsed SIPia message data (238).

The processes disclosed herein differ from the prior art, for example, in that each layer (including the application) uses its own SIP structure to process it. This would require each layer to first "translate" the incoming message to its own format, process it, and then send it to the next layer that would have to do the same thing.

In the prior art, when two boards have to talk to each other, a SIP text message is typically used which requires the first one to serialize completely the message, and the second one to parse the message received. (Parsing is the most processing intensive activity in the SIP stack.)

Also, in the prior art, each layer (including the application) would have used its own memory buffer. Thus, each layer would need to then allocate a new memory buffer for each incoming message, and release it when it is sent to the next layer.

The concept of "lazy parsing" (i.e., parsing only what you need to parse) by using a common SIPia message in the SIP layers and in the application is much easier. In addition, this type of parsing is "transparent" for the SIPia message "user." Parsing is executed when the user wants to "read" a SIP field. Whether the SIP field is already parsed, or need to be parsed is invisible to the user. If it was not parsed, it will automatically be parsed. When a field is parsed for a user, the result is written in the SIPia message and will be available to any other layer (without re-parsing).

The embodiments disclosed herein support various features, including, but not limited to:
- On demand parsing (no need to parse the whole SIP message).
- Single mono-block structure (no need for multiple allocation/de-allocation of memory blocks).
- Efficient copying and modification of SIP messages by using differential pointers.
- Single SIPia message format from the low SIP layers to the application.
- Sharing the SIPia message "as is" with other boards (similar to word/bit encoding).
- Full API encapsulation to isolate the user from the internal message structure.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. In a communications network, a method of processing a SIP message comprising:
   receiving a Session Initiation Protocol (SIP) message via a SIP server, wherein the SIP message includes a plurality of headers and text;
   allocating a new mono block structure via the SIP server, the structure including a plurality of zones;
   reading the SIP message via the SIP server;
   creating at least one header descriptor in a first zone in the mono block structure via the SIP server;
   copying the SIP message to second zone in the mono block structure via the SIP server; and
   pre-parsing the second zone via the SIP server;
   wherein pre-parsing the second zone comprises:
      updating the corresponding header descriptor in the mono block structure for each header that is recognized;
      pointing a raw text pointer to the corresponding SIP text stored in the second zone of the mono block structure;
      storing the actual length of the SIP text in the header descriptor; and
      leaving a pointer to the decoded portion of the text empty.

2. The method defined in claim 1, wherein a transport layer in a SIP stack allocates the mono block structure.

3. The method defined in claim 1, wherein the plurality of zones in the mono block structure includes a management information memory zone, a table of content, a dynamic objects zone, and a free zone.

4. The method defined in claim 1, wherein the plurality of zones in the mono block structure includes a management information memory zone having a fixed length, a table of content having a fixed length, an initial raw text zone having a variable length, a dynamic objects zone having a variable length, and a free zone having a variable length.

5. The method defined in claim 4, wherein the first zone comprises the table of content of the mono block structure.

6. The method defined in claim 5, wherein the second zone comprises the initial raw text zone of the mono block structure.

7. The method defined in claim 6, wherein the mono block structure further comprises a set of differential pointers.

8. The method defined in claim 7, wherein each header comprises one or more objects.

9. In a communications network, a Session Initiation Protocol (SIP) server for processing a SIP message, the server operative to:
   receive a SIP message, wherein the SIP message includes a plurality of headers and text;
   allocate a new mono block structure, the structure including a plurality of zones;
   read the SIP message;
   create at least one header descriptor in a first zone in the mono block structure;
   copy the SIP message to second zone in the mono block structure;
   pre-parse the second zone;
   update the corresponding header descriptor in the mono block structure for each
   header that is recognized;
   point a raw text pointer to the corresponding SIP text stored in the second zone of the mono block structure;
   store the actual length of the SIP text in the header descriptor; and
   leave a pointer to the decoded portion of the text empty.

10. The SIP server defined in claim 9, wherein a transport layer allocates the mono block structure.

11. The SIP server defined in claim 9, wherein the plurality of zones in the mono block structure includes a management information memory zone, a table of content, a dynamic objects zone, and a free zone.

12. The SIP server defined in claim 9, wherein the plurality of zones in the mono block structure includes a management information memory zone having a fixed length, a table of content having a fixed length, an initial raw text zone having a variable length, a dynamic objects zone having a variable length, and a free zone having a variable length.

13. The SIP server defined in claim 12, wherein the first zone comprises the table of content of the mono block structure.

14. The SIP server defined in claim 13, wherein the second zone comprises the initial raw text zone of the mono block structure.

15. The SIP server defined in claim 14, wherein the mono block structure further comprises a set of differential pointers.

16. The SIP server defined in claim 15, wherein each header comprises one or more objects.

* * * * *

UNITED STATES PATENT AND TRADEMARK OFFICE
CERTIFICATE OF CORRECTION

PATENT NO. : 7,644,165 B2
APPLICATION NO. : 11/141546
DATED : January 5, 2010
INVENTOR(S) : Bessis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this

Twenty-first Day of December, 2010

David J. Kappos
*Director of the United States Patent and Trademark Office*